United States Patent [19]

Kudo et al.

[11] Patent Number: 4,621,317
[45] Date of Patent: Nov. 4, 1986

[54] ARITHMETIC LOGIC UNIT OF A SEQUENCE CONTROLLER

[75] Inventors: Toichi Kudo, Yokohama; Takasi Abe, Funabashi; Seiichiro Ogawa, Ichikawa, all of Japan

[73] Assignees: Hitachi, Ltd., Tokyo; Nissan Motor Co., Ltd., Yokohama, both of Japan

[21] Appl. No.: 350,614

[22] Filed: Feb. 22, 1982

[30] Foreign Application Priority Data

Feb. 27, 1981 [JP] Japan .................... 56-26747

[51] Int. Cl.[4] .................................. G06F 15/46
[52] U.S. Cl. ............................... 364/147; 364/900
[58] Field of Search .............. 364/147, 200 MS File, 364/900 MS File, 736, 740

[56] References Cited

U.S. PATENT DOCUMENTS

| | | | |
|---|---|---|---|
| 4,021,783 | 5/1977 | Highberger | 364/900 |
| 4,025,902 | 5/1977 | Nakao et al. | 364/147 |
| 4,038,533 | 7/1977 | Dummermuth et al. | 364/900 X |
| 4,217,658 | 8/1980 | Henry et al. | 364/147 |
| 4,227,247 | 10/1980 | Kintner | 364/147 X |
| 4,244,034 | 1/1981 | Cherba | 364/147 X |
| 4,247,909 | 1/1981 | Bradley et al. | 364/147 X |
| 4,249,248 | 2/1981 | Yomogida et al. | 364/900 |
| 4,396,979 | 8/1983 | Mor et al. | 364/200 |
| 4,432,047 | 2/1984 | Okayama | 364/147 |
| 4,441,161 | 4/1984 | Sasaki et al. | 364/900 |

Primary Examiner—Eddie P. Chan
Attorney, Agent, or Firm—Antonelli, Terry & Wands

[57] ABSTRACT

An arithmetic logic unit for a stored program sequence controller stores a program equivalent to a relay sequence in a program memory and executes sequence control in accordance with the stored program. A first push-down storage register for sequentially storing logical operation results at branch start points of the relay sequence and a second push-down storage register for sequentially storing logical operation results for branches connected to the branch points based on the logical operation results stored in the first push-down storage register are provided. The arithmetic logic unit carries out the operations based on the logical operation results stored in the first and second push-down storage registers.

5 Claims, 10 Drawing Figures

FIG. 4
```
PROGRAM        STEP
LOD    A  ----- 1
LOD    B  ----- 2
AND    C  ----- 3
LOD    D  ----- 4
AND    E  ----- 5
ORSTR     ----- 6
ANDSTR    ----- 7
OUT    F  ----- 8
```
FIG. 5
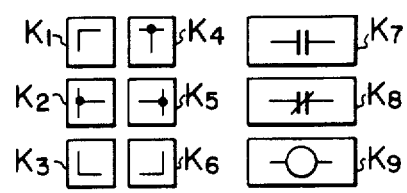
FIG. 6
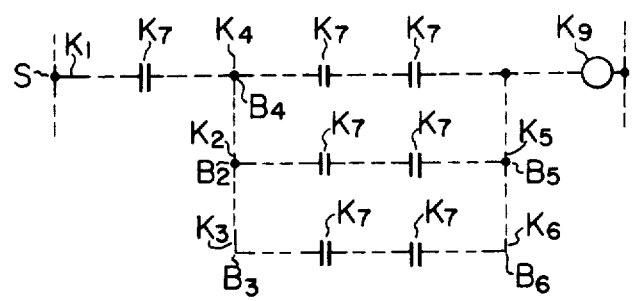
FIG. 8
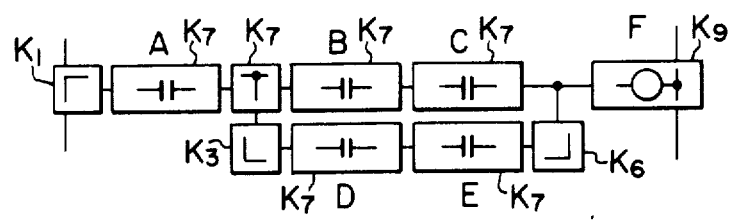

| INSTRUCTION | CONTENT |
|---|---|
| ⌐ ─┤├─ <br> (⌐ ─┤╱├─) |  |
| ┬ ─┤├─ <br> (┬ ─┤╱├─) |  |
| ├ ─┤├─ <br> (├ ─┤╱├─) |  |
| └ ─┤├─ <br> (└ ─┤╱├─) |  |
| ─┤├─ <br> (─┤╱├─) |  |
| ─┤ |  |
| ─┘ | SAME AS ABOVE |
| ─○┤ |  |
| ┬ ─○┤ |  |
| ├ ─○┤ |  |
| └ ─○┤ |  |

ARITHMETIC LOGIC UNIT OF A SEQUENCE CONTROLLER

BACKGROUND OF THE INVENTION

The present invention relates to an arithmetic logic unit of a stored program sequence controller which stores a program equivalent to a relay sequence in a program memory and carries out sequence control in accordance with the stored program.

A conventional arithmetic logic unit of the sequence controller of this type includes a result memory and arithmetically or logically processes signals from a signal input device and a signal output device and signals stored in the result memory in accordance with the program stored in the program memory.

FIG. 1 shows an example of the conventional sequence controller in which PM denotes a program memory, I/O denotes a signal input/output device and ALU denotes an arithmetic logic unit. The program memory stores a program equivalent to a relay sequence. The program consists of an aggregation of instructions each comprising an operation code field OP indicating a type of instruction INS and an operand field OR for specifying signals to be processed by the instruction, as shown in FIG. 2. The program memory PM sequentially and cyclically reads out the instructions stored therein. The operation code field OP of the read instruction is fed to the arithmetic logic unit ALU through an instruction signal line 6, and the operand field OR is fed to the signal input/output device I/O through an input/output select signal line 7. The signal input/output device I/O may be connected to an equipment for detecting status of a process which controls the sequence controller, such as limit switches, and connected to a process equipment which the sequence controller controls, such as solenoid switches or solenoid valves. The signal input/output device I/O receives the operand field OR, selects the input/output signals to be processed and supplies the selected input/output signals to the arithmetic logic unit ALU through an input/output read signal line 10 in accordance with timing of an input/output control signal which is supplied from the arithmetic logic unit ALU through an input/output control signal line 13. The arithmetic logic unit ALU comprises an arithmetic logic circuit 1, an accumulator 2 and a result storing register 3 and the arithmetic logic circuit 1 carries out predetermined arithmetic and logic operations on the signals supplied from the accumulator 2, the signal input/output device I/O and the result storing register 3 in accordance with the operation code OP supplied through the instruction signal line 6. Upon the end of the arithmetic and logic operations, the arithmetic logic circuit 1 issues a stepping signal to the program memory PM through a stepping signal line 8 to read out the next instruction. The arithmetic logic circuit 1 then again carries out the arithmetic and logic operations in accordance with the operation field OP of the instruction. The above operation is repeated to carry out the control process.

FIG. 3 shows an example of a relay sequence, in which A, B, C, D and E denote contacts and F denotes a relay coil. A prior art sequence controller is explained in detail with reference to FIG. 3. The relay sequence is converted to a program by aggregation of instructions LOD, AND, OR, AND STR, OR STR and OUT, and the program thus constructed is stored in the program memory PM. The operations of the arithmetic logic unit ALU for the respective instructions are shown below.

LOD instruction: Store the content of the accumulator 2 in the result storing register 3 and read the signal from the signal input/output device I/O into the accumulator 2.

AND instruction: AND the content of the accumulator 2 with the signal from the signal input/output device I/O and load the result in the accumulator 2.

OR instruction: OR the content of the accumulator 2 with the signal from the signal input/output device I/O and load the result in the accumulator 2.

AND STR instruction: AND the content of the accumulator 2 with the signal from the result storing register 3 and load the result in the accumulator 2.

OR STR instruction: OR the content of the accumulator 2 with the signal from the result storing register 3 and load the result in the accumulator 2.

OUT instruction: Output the content of the accumulator 2 to the signal input/output device I/O.

With these instructions, the relay sequence shown in FIG. 3 is converted to the program shown in FIG. 4. For the sake of convenience of the explanation, step numbers are shown on the right hand. Referring to FIG. 4, when the step 1 instruction is read out of the program memory PM, "LOD" in the operation code field is applied to the arithmetic logic circuit 1 through the instruction signal line 6. The signal input/output device I/O selects "A" in the operand field through the input/output selection signal line 7 and produces a logical status signal for the input/output signal A. The arithmetic logic circuit 1 stores the output from the accumulator 2 in the result storing register 3 through an accumulator output signal line 9. The result storing register 3 is a bilaterally shiftable push down register having a common signal input and output port. A signal is stored while shifting the content of the result storing register 3 by a shift signal applied through a shift signal line 12. The content of the accumulator 2 is stored in the result storing register 3 and the signal A selected by "A" in the operand field supplied from the signal input/output device 4 (which signal A is the logical status signal "1" or "0" corresponding to ON or OFF state of the contact A selected by "A" in the operand field and is expressed in this manner for the sake of convenience of explanation. Similar expessions are used for the other signals) is read into and stored in the accumulator 2. In the step 2, the signal A stored in the accumulator 2 is stored in the result storing register 3 and a newly selected signal B is stored in the accumulator 2. In the step 3, the signal stored in the accumulator 2 and a signal C selected by the signal input/output device I/O are logically ANDed and the result is stored in the accumulator 2. In the step 4, the content of the accumulator 2 is stored in the result storing register 3 and a signal D is stored in the accumulator 2. In the step 5, the signal D stored in the accumulator 2 and a signal E selected by the signal input/output device I/O are logically ANDed and the result is stored in the accumulator 2. In the step 6, the signal last stored in the result storing register 3 is supplied to the arithmetic logic circuit 1 from the result storing register 3 through a read signal line 11. The signal supplied is a logical AND function of the signals B and C. This signal is logically ANDed with the content of the accumulator 2 and the result is stored in the accumulator 2. As the data stored in the result storing register 3 is read out, the content of the result storing register 3 is shifted in opposite direction to the store operation. In the step 7, the signal A is at the position in the result storing register 3 which is closest to the output end by the shift operation in the previous step 6. The signal A from the result storing register 3 is supplied to the arithmetic logic circuit 1 through the read signal line 11. A logical function of the signal A and the content of the accumulator 2 is stored in the accumulator 2. In the step 8, the content of the accumulator 2 is outputted at the position in the signal input-/output device I/O selected by "F" of the operand field.

In this manner, the relay sequence shown in FIG. 3 is converted to the program shown in FIG. 4 which is equivalent to the relay sequence.

In the prior art unit thus constructed, if a programmer does not fully understand that the LOD instruction stores the result in the result storing register 3, the AND STR instruction and the OR STR instruction read out the content of the result storing register to use it in the operation and other instructions execute the respective operations, the programmer cannot program the instruction sequence. In addition, in order to understand those, the programmer is required to be aware of the internal construction of the sequence controller to a certain extent. As is apparent from the comparison of FIGS. 3 and 4, the expression of the instructions and the symbols of the instruction sequence do not correspond one to one but the expression of the instruction is in alphabetical language form so that the relay sequence of FIG. 3 must be rewritten into the program in the form of language as shown in FIG. 4. As a result, in the prior art unit, the programmer must be knowledgable to a considerable extent and a large number of steps are required to program the relay sequence.

When the relay sequence of FIG. 3 is to be constructed from the language program as shown in FIG. 4 by a reverse conversion process, the operator encounters a big difficulty because the symbols of the relay sequence and the language instructions do not correspond one to one.

Accordingly, keys $K_1, K_2, K_3, \ldots K_9$ having keytops marked with elements of the relay sequence as shown in FIG. 5 are provided on a programming panel so that a relay sequence as shown in FIG. 6 can be programmed by keying those keys. In this manner, the expression of the instructions and the symbols of the relay sequence are related one to one to overcome the above difficulty.

SUMMARY OF THE INVENTION

It is an object of the present invention to provide an arithmetic logic unit of a sequence controller capable of executing a program constructed by a group of instructions which one-to-one correspond to symbols of a relay sequence.

It is another object of the present invention to provide an arithmetic logic unit of a sequence controller which facilitates programming of the sequence controller.

It is a further object of the present invention to provide an arithmetic logic unit of a sequence controller which allows the construction of a program in a short time period.

In order to attain the above objects, the present invention is characterized by the provision of two storage means, one for sequentially storing logical operation results at branch points of the relay sequence and the other for sequentially storing logical operation results of branches branched from the branch points based on the logical operation results stored in the one storage means. Based on the logical operation results stored in the first and second storage means, a predetermined operation is carried out.

In this manner, the arithmetic logic unit of the sequence controller which can execute the program constructed by the group of instructions which one-to one correspond to the symbols of the relay sequence can be provided. This means that the sequence controller which allows the relay sequence to be programmed with the instructions which one-to-one correspond to the symbols of the relay sequence is provided. Thus, the arithmetic logic unit of the sequence controller which allows the sequence controller which facilitates programming in a short time period to be attained is provided.

BRIEF DESCRIPTION OF THE DRAWINGS

The other features and advantages of the present invention will be apparent from the following description made in conjunction with the accompanying drawings, in which:

FIG. 4 shows a program by the prior art sequence controller, FIGS. 5 and 6 illustrate the present invention, FIG. 8 shows an example of programming procedure in accordance with the present invention.

DESCRIPTION OF THE PREFERRED EMBODIMENT

Figure 1:
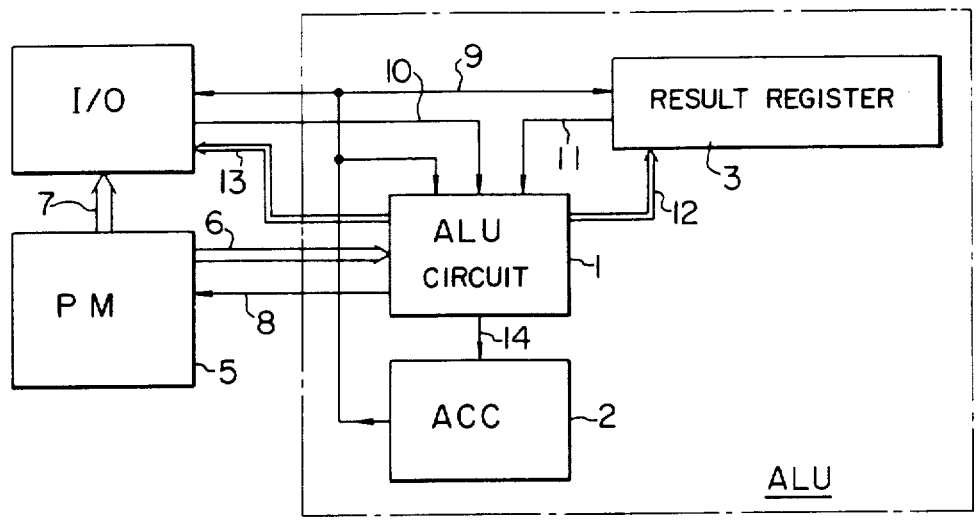
FIG. 1 shows a block diagram of a configuration of a prior art sequence controller.
Figure 7:
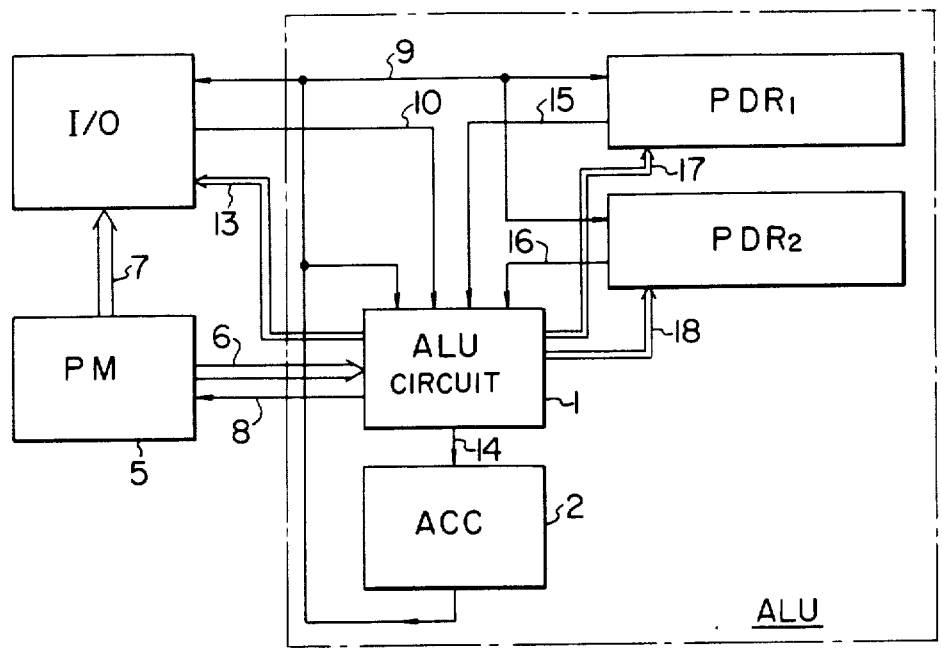
FIG. 7 shows one embodiment of the present invention.

One embodiment of the present invention is now explained with reference to FIG. 7, which shows an overall configuration of a sequence controller. Like numerals and symbols to those shown in FIG. 1 denote like elements. $PDR_1$ and $PDR_2$ denote first and second storage means which are principal parts of the present invention. In the present embodiment, they are push-down registers which are bilaterally shiftable and have common signal input and output ports. The content of the accumulator 2 is applied to the push-down registers $PDR_1$ and $PDR_2$ through an accumulator signal output line 9. The outputs of the push-down registers $PDR_1$ and $PDR_2$ are constantly applied to the arithmetic logic circuit 1 through readout signal lines 15 and 16, respectively. The signals of the outputs of the push-down signals $PDR_1$ and $PDR_2$ which are stored at the bit positions closest to the respective input ports are supplied to the arithmetic logic circuit 1. Numerals 17 and 18 denote shift signal lines through which shift signals for shifting the push-down registers $PDR_1$ and $PDR_2$ are supplied from the arithmetic logic circuit 1 to the respective push-down registers $PDR_1$ and $PDR_2$. When a shift-right signal is applied to the push-down register $PDR_1$ or $PDR_2$, the signals stored therein are shifted right by one bit position and the content of the accumulator 2 is stored in the bit position closest to the input port. The content stored at the bit position closest to the input port is applied to the arithmetic logic circuit 1 through the readout signal line 15 or 16. When a shift-left signal is applied to the push-down register $PDR_1$ or $PDR_2$, the signals stored therein are shifted left by one bit position and the signal shifted to the bit position closest to the input port is supplied to the arithmetic logic circuit 1.

In accordance with the present invention, a program can be constructed by the symbols of the relay sequence shown in FIG. 5. The connection keys $K_1$, $K_2$, $K_3$, $K_4$ and $K_5$ of the keys shown in FIG. 5 indicating the connection status and element keys $K_7$, $K_8$ and $K_9$ indicating the elements of the relay sequence may each represent one instruction, but in the illustrated embodiment the start point key $K_1$ indicating a start point S of the relay sequence, the branch continuation key $K_2$ indicating a branch midpoint $B_2$, the branch end point key $K_3$ indicating a branch end point $B_3$ and the branch start point key $K_4$ indicating a branch start point $B_4$ construct one instruction by combining with the normally open contact key $K_7$, the normally closed contact key $K_8$ and the relay coil key $K_9$. The branch junction keys $K_5$ and $K_6$ indicating branch junction points $B_5$ and $B_6$ and the element keys $K_7$, $K_8$ and $K_9$ each construct one instruction.

Figure 3:
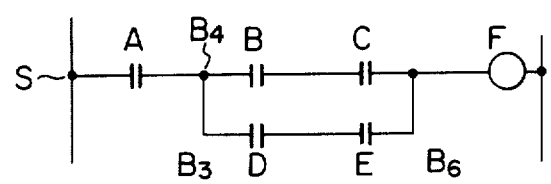
FIG. 3 shows an example of a relay sequence.
Figure 9:
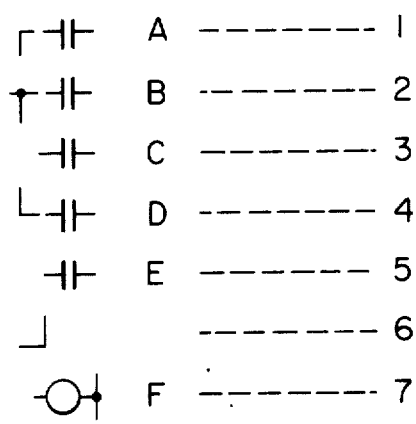
FIG. 9 shows an example of a program in accordance with the present invention.
Figure 10:
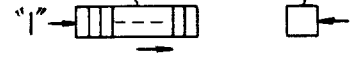
FIG. 10 shows contents of instructions which can be executed in accordance with the present invention.
Figure 10:
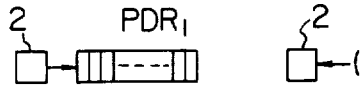
Figure 10:
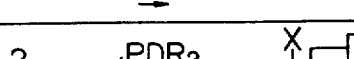
Figure 10:
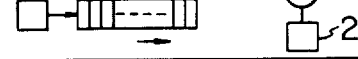
Figure 10:
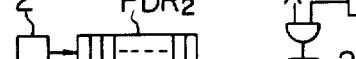
Figure 10:
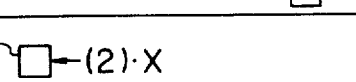
Figure 10:
Figure 10:
Figure 10:
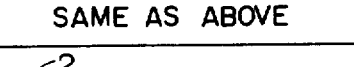
Figure 10:

FIG. 8 illustrates the operation of the keys $K_1$, $K_2$, $K_3$, ... $K_9$ for programming the relay sequence shown in FIG. 3, and FIG. 9 shows a program constructed thereby. For the sake of convenience of explanation, step numbers are shown on the right hand of FIG. 9. The program thus constructed is stored in the program memory PM. FIG. 10 shows the execution processes of the arithmetic logic unit ALU for the respective instructions. The execution processes for the instructions are now explained with reference to FIG. 10. For the sake of convenience of the explanation, the contact is designated by X and the relay coil is designated by Y. The arrows marked to the first and second push-down registers $PDR_1$ and $PDR_2$ show the shift directions of the registers. Combined instruction of the key $K_1$ and the key $K_7$ (or the key $K_8$):

Shift a logical "1" signal into the first push-down register $PDR_1$ and store it therein, and read the signal X from the signal input/output device I/O into the accumulator 2.

Combined instruction of the key $K_4$ and the key $K_7$ (or the key $K_8$):

Store the content of the accumulator 2 in the first push-down register $PDR_1$ and store the logical AND function of the content of the accumulator 2 and the signal from the signal input/output device I/O in the accumulator 2.

Combined instruction of the key $K_2$ and the key $K_7$ (or the key $K_8$):

Store the content of the accumulator 2 in the second push-down register $PDR_2$ and store the logical AND function of the signal from the first push-down register $PDR_1$ and the signal from the signal input/output device I/O in the accumulator 2. The first push-down register is not shifted when it is read.

Combined instruction of the key $K_3$ and the key $K_7$ (or the key $K_8$):

Store the content of the accumulator 2 in the second push-down register $PDR_2$ and store the logical AND function of the signal from the first push-down register $PDR_1$ and the signal from the signal input/output device I/O in the accumulator 2. The first push-down register $PDR_1$ is shifted in the direction of the arrow when it is read.

Key $K_7$ (or key $K_8$) instruction:

Logically AND the content of the accumulator 2 with the signal from the signal input/output device I/O and store the result in the accumulator 2.

Key $K_5$ instruction:

Logically OR the output signal of the second push-down register $PDR_2$ with the content of the accumulator 2 and store the result in the accumulator 2.

Key $K_6$ instruction:

Same as the key $K_5$ instruction.

Key $K_9$ instruction:

Output the content of the accumulator 2 to the signal input/output device I/O.

Combined instruction of the key $K_4$ and the key $K_9$:

Store the content of the accumulator 2 in the first push-down register $PDR_1$ and output the content of the accumulator 2 to the signal input/output device I/O. This instruction is used when the coil is further branched.

Combined instruction of the key $K_2$ and the key $K_9$:

Read the output signal of the first push-down register $PDR_1$ into the accumulator 2 and output the read signal to the signal input/output device I/O. The first push-down register $PDR_1$ is not shifted when it is read.

Combined instruction of the key $K_3$ and the key $K_9$:

Read the output signal of the first push-down register $PDR_1$ into the accumulator 2 and output the read signal to the signal input/output device I/O. The first push-down register $PDR_1$ is shifted in the direction of the arrow when it is read.

The arithmetic logic circuit 1 of the arithmetic logic unit ALU reads the instruction from the program memory PM to shift the first and second push-down registers $PDR_1$ and $PDR_2$ to the predetermined states at appropriate timing and carries out the predetermined operation.

Figure 2:
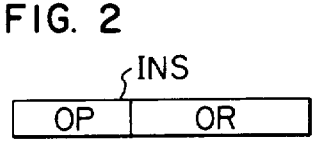
FIG. 2 shows an instruction format.

The program stored in the program memory PM consists of a group of instructions INS each comprising an operation code field OP indicating the type of the instruction and an operand field OR for selecting the signals to be processed, as is the case of FIG. 2. In the present embodiment, the operation code field OP comprises a code which corresponds to the keys $K_1$, $K_2$, $K_3$, ... $K_9$ of FIG. 5. The operation code field OP is supplied to the arithmetic logic circuit 1 through the instruction signal line 6 to convey the type of the operation to the arithmetic logic circuit 1. The operand field OR is supplied to the signal input/output device I/O through the input/output selection signal line 7 to select the input/output signals to be processed. The signal input/output device I/O supplies the selected signals to the arithmetic logic circuit 1 as the input/output read signals through the input/output read signal line 10 at the timing of the input/output control signal supplied from the arithmetic logic circuit 1. The content of the accumulator 2, is latched at the position selected by the input/output selection signal 7 at the timing of the input/output control signal through the accumulator output signal line 9. The arithmetic logic circuit 1 carries out the predetermined operations on the signals from the accumulator 2, the signal input/output device I/O and the first and second push-down registers $PDR_1$ and $PDR_2$ in accordance with the operation code OP supplied through the instruction signal line 6. Upon the termination of the operation, the arithmetic logic circuit 1 applies a stepping signal to the program memory PM through the stepping signal line 8 to increment the read-to address of the program memory PM by one and read out the next instruction. The above operation is repeated to continue the operation. The first and second push-down registers $PDR_1$ and $PDR_2$ are bilaterally shiftable shift registers and the signals to the push-down registers $PDR_1$ and $PDR_2$ are stored by applying the shift signal from the arithmetic logic circuit 1 to the push-down registers $PDR_1$ and $PDR_2$ to inwardly shift the contents of the push-down registers $PDR_1$ and $PDR_2$ and storing the content of the accumulator 2 at the bit positions closest to the input ports. The signals stored at the bit positions closest to the input ports are supplied to the arithmetic logic circuit 1 through the read signal lines 15 and 16 for use as the signals to be processed.

The operation is explained in further detail with reference to FIG. 9. The instruction of the step 1 indicates the contact from a bus of the relay sequence. Under this instruction, a logical "1" signal is stored in the first push-down register $PDR_1$ and a signal A specified by "A" of the operand field from the signal input/output device I/O is read into the accumulator 2 and stored therein. In the step 2, the content of the accumulator 2 is stored in the first push-down register $PDR_1$ and the content of the accumulator 2 is logicaly ANDed with a signal B from the signal input/output device I/O and the result is stored in the accumulator 2. In the step 3, the content of the accumulator 2 is logically ANDed with a signal C from the input/output device I/O and the result is stored in the accumulator 2. At this time point, the accumulator 2 stores the logical AND function of the signals A, B and C. In the step 4, the content of the accumulator 2 is stored in the second push-down register $PDR_2$, and the signal from the first push-down register $PDR_1$ is logically ANDed with a signal D and the result is stored in the accumulator 2. Simultaneously with the above operation, the content of the first push-down register $PDR_1$ is shifted toward the output port. As a result, the first push-down register $PDR_1$ outputs the signal A so that the logical AND function of the signals A and D is stored in the accumulator 2. In the step 5, the content of the accumulator 2 is logically ANDed with a signal E from the signal input/output device I/O and the result is stored in the accumulator 2. In the step 6, the content of the accumulator 2, that is, the logical AND function of the signals A, D and E is logically ORed with the output signal of the second push-down register $PDR_2$, that is, the logical AND function of the signals A, B and C, and the result is stored in the accumulator 2. Simultaneously with the above operation, the second push-down register $PDR_2$ is shifted toward the output port. In the step 7, the content of the accumulator 2, that is, the final result is latched at the position selected by "F" of the operand from the signal input/output device I/O.

In this manner, the sequence control equivalent to the relay sequence shown in FIG. 8 is attained by the program shown in FIG. 9. The sequence controller sequentially and cyclically executes the program to control the relay coil F to the status determined by the input signals A, B, C, D and E.

In the illustrated embodiment, the relay sequence is constructed by the normally open contacts. When the normally closed contacts are used, the signals from the signal input/output device I/O are inverted by a signal inverter circuit, not shown, located at the input of the arithmetic logic unit ALU. In this manner, the operation of the relay sequence including the normally closed contacts can be handled in the same manner as that of the normally open contact relay sequence. By way of example, the symbols in parentheses in FIG. 10 show the case where the normally closed contacts are used.

In the illustrated embodiment, the push-down registers are used as the first and second storage means. The sequence controller may, in certain cases, include a microcomputer. In this case, it is possible to additionally provide the push-down registers $PDR_1$ and $PDR_2$ but the same function can be attained by utilizing a readable and writable memory included in the microcomputer. In this case, predetermined addresses of the memory are reserved as the storage means. In the shift operation, the content of the memory is read into an accumulator of the microcomputer and the content is shifted within the accumulator by utilizing the function of the microcomputer. The content of the accumulator at the end of the shift operation is stored at the same addresses as those described above. The same function may be attained by allocating predetermined areas each having a plurality of addresses of the readable and writable memory of the microcomputer to the first and second storage means and pointing to the addresses of the areas. When the push-down registers are used as the first and second storage means as in the case of the preferred embodiment, the process operation can be simplified.

While the symbols shown in FIG. 5 are illustrated in the embodiment, the present invention is not limited to those symbols but other symbols may be used as required.

In summary, the present invention provides the arithmetic logic unit of the sequence controller comprising the first storage means for sequentially storing the logical operation results at the branch start points of the relay sequence and the second storage means for sequentially storing the logical operation results for the branches connected to the branch points based on the logical operation results stored in the first storage means, for carrying out the arithmetic and logic operations based on the contents stored in the first and second storage means. The storage means are not limited to the illustrated registers so long as the same functions are attained. Any other symbols may be used so long as they provide clear distinctions between the branching points of the relay sequence and the branches connected to the branching points.

It should be understood that a variety of modifications can be constructed without departing from the spirit and the scope of the present invention and the present invention is not limited to the specific embodiments but covers the scope as defined in the appended claim.

What is claimed is:

1. An arithmetic logic unit of a sequence controller having an input/output circuit for providing logic status signals of selected input elements and output signals to selected output elements, and program memory means for storing a sequence program equivalent to a relay sequence having one or more branches for executing sequence control in accordance with the stored sequence program, wherein said sequence program is constituted by a combination of first instructions relating to connection status indicating a start point, a branch start point, a branch continuation, a branch end point and a branch junction point provided in the relay sequence, and second instructions indicating input and output elements provided in the relay sequence; said arithmetic logic unit comprising:

an accumulator for successively storing intermediate results of logical operations and output signals for application to said input/output circuit;

a first push-down register and a second push-down register each capable of shifting bidirectionally and each having a common inlet/outlet for a signal; and operation control means connected to said accumulator, said program memory means and said first and second push-down registers, and being (1) responsive to an instruction indicating the start point for shifting a logic signal of a predetermined initial status into said first push-down register;

(2) responsive to an instruction indicating the branch start point for shifting the content stored at that time in said accumulator into said first push-down register;

(3) responsive to an instruction indicating the branch continuation or the branch end point for shifting the content of said accumulator into said second push-down register;

(4) responsive to an instruction indicating the branch continuation followed by an input element for performing a logical AND operation of the output signal from said first push-down register and a selected logical status signal of an input element without a shifting operation of said first push-down register and then storing the AND operation result into said accumulator;

(5) responsive to an instruction indicating the branch end point followed by an input element for performing a logical AND operation of the output signal from said first push-down register and the logical status signal of a selected input element by means of an output shifting operation of said first push-down register followed by storing the AND operation result into said accumulator;

(6) responsive to an instruction indicating the branch continuation followed by an output element for storing the output content from said first push-down register into said accumulator without a shifting operation of said first push-down register;

(7) responsive to an instruction indicating the branch end point followed by an output element for storing the output content from said first push-down register into said accumulator by means of an output shifting operation of said first push-down register; and (8) responsive to the instruction indicating the branch junction point for performing a logical OR operation of the output signal from said second push-down register and the content of said accumulator by means of an output shifting operation of said second push-down register followed by storing the OR operation result into said accumulator; and (9) responsive to an instruction indicating an output element for outputting the content of said accumulator to a corresponding output element via said input/output circuit.

2. An arithmetic logic unit of sequence controller according to claim 1, wherein the logical operation results of said operation control means are stored in said first and second push-down registers by way of said accumulator in successive operations based on the operations of said operation control means.

3. An arithmetic logic unit of a sequence controller according to claim 2, wherein said operation control means sequentially stores the content of said accumulator representing the branch start points of the relay sequence in said first push-down register.

4. An arithmetic logic unit of a sequence controller according to claim 2, wherein said operation control means logically ANDs the logical operation results at the branch start points with the logical operation results for the branches of said relay sequence and sequentially stores the results for the respective branches of said relay sequence in said second push-down register.

5. An arithmetic logic unit of a sequence controller according to claim 2, wherein said operation control means logically ORs the logical operation results for the branches of said relay sequence based on the logical operation results at the branch start points and at the branch end points.

* * * * *